United States Patent
Bahar et al.

[19]

[11] Patent Number: 6,029,609

[45] Date of Patent: Feb. 29, 2000

[54] FOLDABLE PET SHELTER

[76] Inventors: Reuben Bahar, 23708 Welby Way, West Hills, Calif. 91307; Moshe J. Ozeri, 23036 Burbank Blvd., Woodland Hills, Calif. 91367

[21] Appl. No.: 09/178,591

[22] Filed: Oct. 26, 1998

[51] Int. Cl.⁷ .................................................. A01K 1/03
[52] U.S. Cl. .......................... 119/474; 119/484; 119/498
[58] Field of Search .................... 119/474, 473, 119/478, 452, 484, 485, 498, 499

[56] References Cited

U.S. PATENT DOCUMENTS

| | | | |
|---|---|---|---|
| 3,738,322 | 6/1973 | Smith | 119/484 |
| 4,021,975 | 5/1977 | Calkins | 52/64 |
| 4,224,899 | 9/1980 | Cruchelow et al. | 119/501 |
| 4,291,645 | 9/1981 | Cruchelow et al. | 119/484 |
| 4,445,459 | 5/1984 | Julie | 119/28.5 |
| 4,989,546 | 2/1991 | Cannaday | 119/484 |
| 5,261,350 | 11/1993 | Vavrek | 119/484 |
| 5,649,500 | 7/1997 | Klavemann et al. | 119/452 |

*Primary Examiner*—Peter M. Poon
*Assistant Examiner*—Yvonne R. Abbott
*Attorney, Agent, or Firm*—Edgar W. Averill, Jr.

[57] ABSTRACT

A foldable pet shelter for attachment around a pet door against the interior surface of an exterior door of a house. The pet shelter has a top panel which is hinged to the interior surface of an exterior door above a pet door. A right side panel and a left side panel are hingedly held along the sides of the top panel and when the shelter is unfolded, the top panel, side panels and an end panel provide a shelter within a residence which permits a pet to enter the residence from the outdoors but retains the pet within the confines of the shelter. This provides a warm or cool place for the pet during inclement weather while still not permitting the pet to roam around the house.

6 Claims, 2 Drawing Sheets

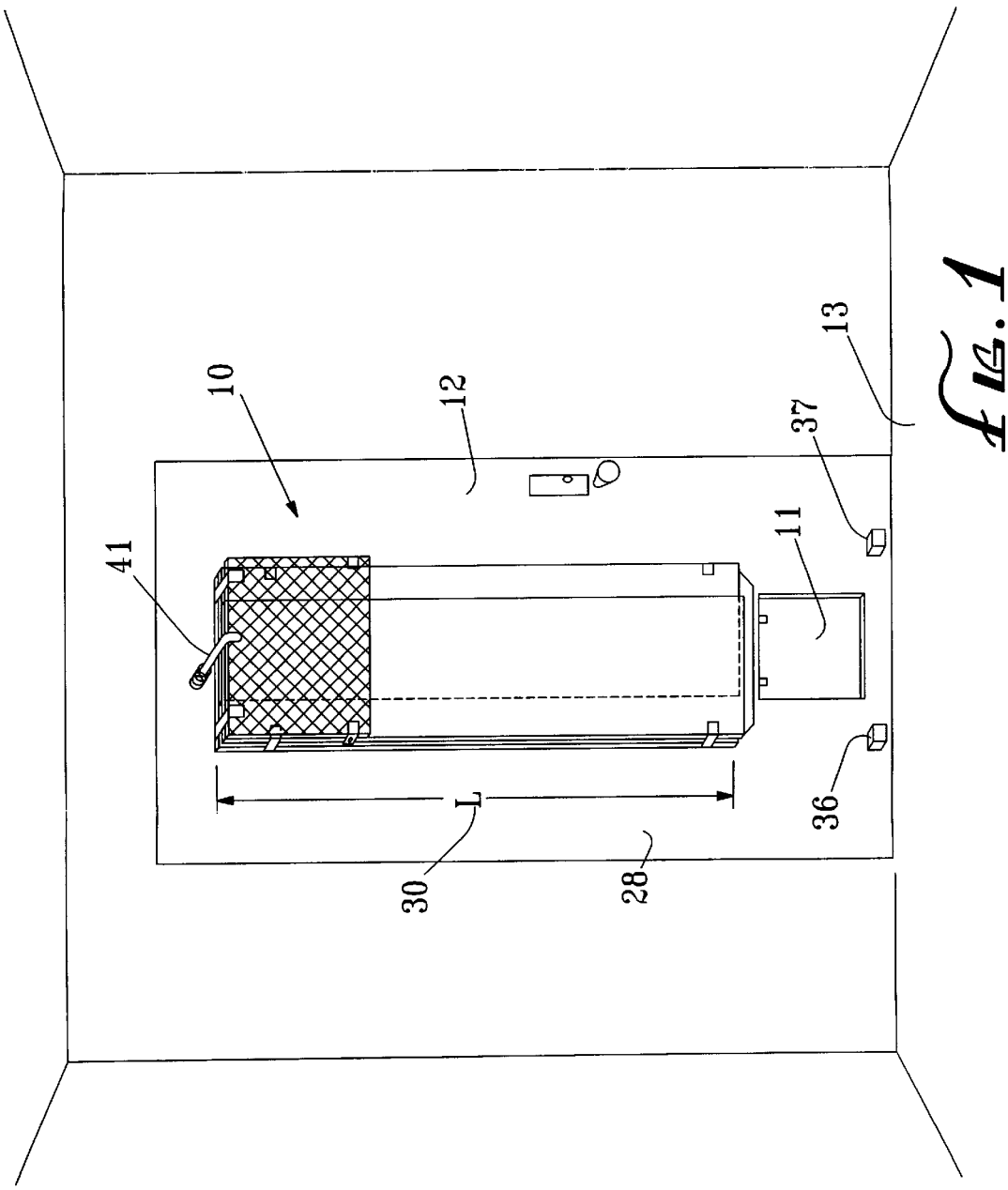

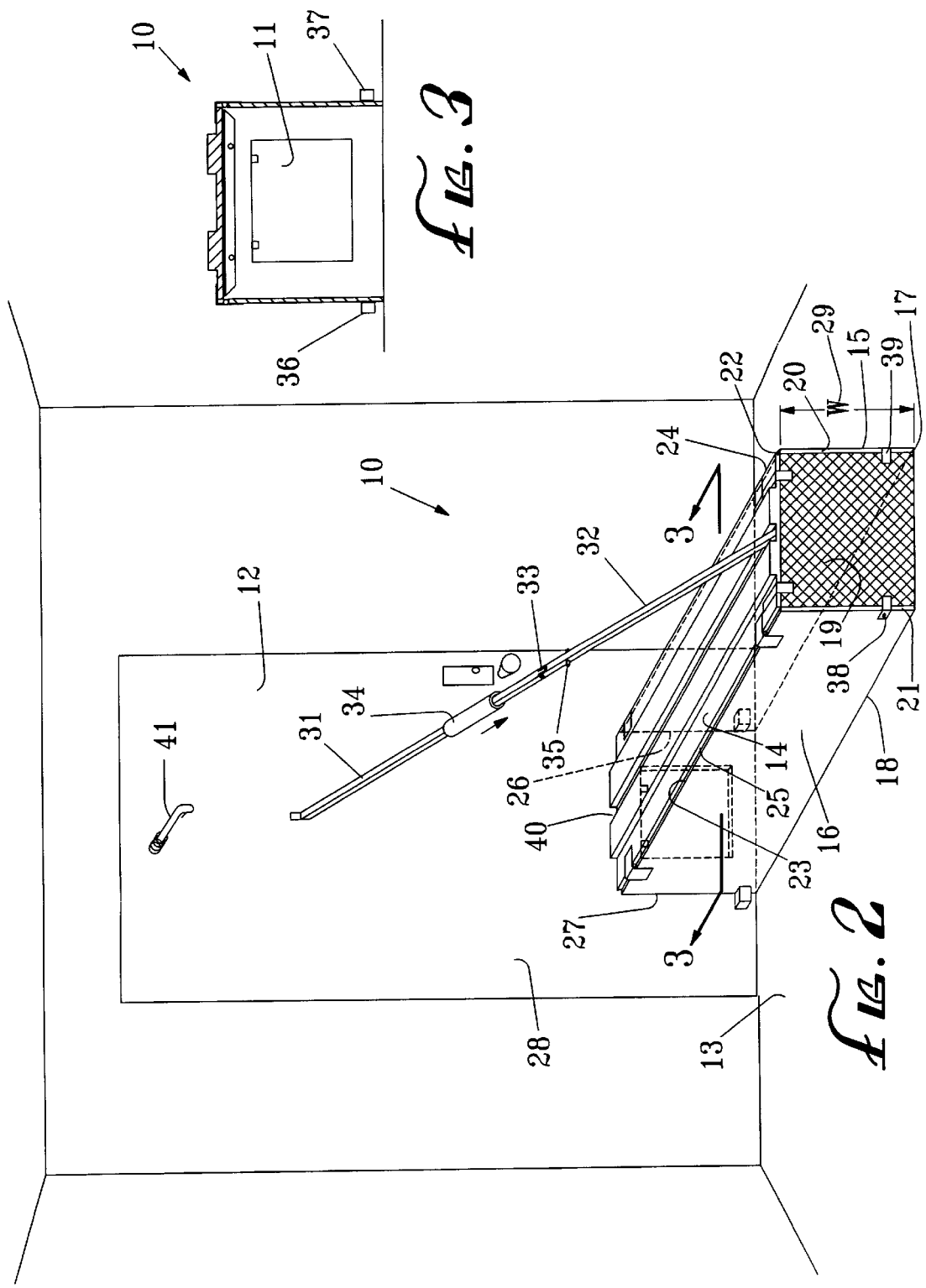

FOLDABLE PET SHELTER

BACKGROUND OF THE INVENTION

The field of the invention is pet shelters and the invention relates more particularly to pet shelters within a residence.

Several patents show a pet shelter with an entrance from an exterior of a residence with the cage portion inside. One such patent is U.S. Pat. No. 3,738,322 which has a solid plastic panel surrounding the shelter and a pair of hinged doors leading to the outside. The shelter is fixed in size and is required to retain its interior volume within the residence.

Another shelter having an exterior entrance is shown in U.S. Pat. No. 2,932,279. Once again, this shelter has no provisions for being folded.

BRIEF SUMMARY OF THE INVENTION

It is an object of the present invention to provide a pet shelter which permits a pet to come in from the outdoors during inclement weather, but which can be readily folded out of the way when not in use.

The present invention is for a foldable pet shelter for attachment around a pet door mounted on an interior surface of an exterior panel of a dwelling. The term "exterior panel" is intended to mean a panel in the dwelling which has an exterior surface leading to an area outside of the dwelling, such as to a garage or back yard. The "exterior panel" also has an interior surface within the dwelling. Thus, the "exterior panel" may be a door leading outside the dwelling, or a wall having an outside or exterior surface and an inside surface. The foldable pet shelter has a top panel having an interior end hingedly affixed to an interior surface of the exterior panel above and adjacent to the pet door. A right side panel and a left side panel both have the same length as the top panel and are hingedly affixed along a right and left edge of the top panel. The width of the side panels is such that when the top panel is horizontal, the side panels rest on the interior floor of the house. The end panel is held against the remote ends of the top, right and left side panels and also extends to the floor. Means are provided, such as a latch, for holding the top panel in a vertical folded position and for holding the top panel in a horizontal position.

BRIEF DESCRIPTION OF THE DRAWINGS

FIG. 1 is a perspective view showing the foldable pet shelter of the present invention folded against the interior side of an exterior door.

FIG. 2 is a perspective view showing the foldable pet shelter of FIG. 1 in an unfolded configuration.

FIG. 3 is a view taken along line 3—3 of FIG. 2.

DESCRIPTION OF THE PREFERRED EMBODIMENTS

A foldable pet shelter 10 is shown in FIG. 1 in a folded configuration. The foldable pet shelter 10 is mounted above a swinging pet door 11 mounted in an exterior panel which is a door 12 of a residence. The floor of the residence is indicated by reference character 13.

The pet shelter in an unfolded configuration is shown in FIG. 2 where a top panel 14 is shown in a horizontal configuration and a right side panel 15 and a left side panel 16 are unfolded so that their bottom edges 17 and 18, respectively, touch the floor 13. End panel or screen 19 is affixed against the remote edges 20 and 21 of the right and left panels, respectively. Top edges 22 and 23 of the right and left side panels are hingedly affixed to the right side 24 and the left side 25 of top panel 14. The inner edges 26 and 27 of the right and left side panels abut the interior surface 28 of door 12. While the shelter is shown mounted in a door, it can, of course, alternatively be mounted in any exterior panel of a residence, but the door is advantageous because it provides an interior entrance.

The width of the right and left side panels is indicated by reference character 29 and the length of the top right and left side panels is indicated by reference character 30 in FIG. 1.

It is beneficial that the top panel be affixed in such a way that it cannot be readily lifted by the pet to escape into the house. This is made possible by a pair of hinged bars 31 and 32 connected at hinge 33. Hinge bar 31 is also connected to door 12 at its upper end. A tube 34 slides over hinge 33 as retained by a pin 35 so that the hinge bars will remain in an extended configuration until released by the homeowner. A spring loaded catch 41 is mounted on the interior surface 28 of door 12 and holds the foldable shelter in its folded position as shown in FIG. 1.

The view of the pet shelter from line 3—3 of FIG. 2 is shown in FIG. 3 where it can be seen that the pet door 11 is fully within the interior of the shelter 10. Also, a pair of stops 36 and 37 may be used to further prevent the outward movement of the doors when the shelter is in its extended configuration as shown in FIG. 2.

The end panel 19 is preferably made from a mesh and may be releasably snapped to the side panels by snaps 38 and 39. These can, of course, be a "Velcro" type holder, a metal snap, a latch and eye arrangement, or other type of holder. A groove 40 is formed in the top panel to provide room for the hinged bars 31 and 32 when the shelter is folded. While the shelter is shown as a rectangular shelter, it can alternatively be made in designs that are circular, triangular or any other geometrical design.

The sides of the shelter can be made from a sheet of plastic, metal, plywood or a screen, and is preferably is made from a wire mesh to further provide ventilation for the pet and also less of an enclosed feeling for the pet. By the use of the pet shelter of the present invention an outdoor pet would no longer be compelled to sleep outside in a cold and damp atmosphere or stay outside in extremely hot temperatures. The shelter provides a pet with the comfort of resting at the indoor temperature while still having the freedom to step outside when desired. The pet is retained from freely roaming within the residence while it is able to go outside anytime it wishes. Additionally, by restraining the pet from roaming freely inside the house, dirt and other debris brought in by the pet is kept outside the interior premises.

The present embodiments of this invention are thus to be considered in all respects as illustrative and not restrictive; the scope of the invention being indicated by the appended claims rather than by the foregoing description. All changes which come within the meaning and range of equivalency of the claims are intended to be embraced therein.

I claim:

1. A foldable pet shelter for attachment around a pet door mounted in an exterior panel of a house slightly above a floor of the house, said foldable pet shelter comprising:

a top panel having an interior end hingedly affixed to an interior surface of the exterior panel above and adjacent to said pet door, said top panel having a remote end, a right side, a left side and a length;

a right side panel having the same length as the top panel and being hingedly affixed along a top edge thereof to the right side of said top panel, said right side panel having a bottom edge and a width sufficient so that the bottom edge of the right side panel rests on the floor and said right side panel having an inner edge and a remote edge;

a left side panel having the same length as the top panel and being hingedly affixed along a top edge thereof to the left side of said top panel, said left side panel having a bottom edge and a width sufficient so that the bottom edge of the left side panel rests on the floor and said left side panel having an inner edge and a remote edge;

an end panel held against the remote ends of said top panel, said right side panel and said left side panel and extending between the top panel and the floor, said end panel having a top edge, a right side, a left side and a bottom;

means for holding the top panel in a vertical folded position; and means for holding the top panel in an extended horizontal position.

2. The foldable pet shelter of claim 1 wherein said means for holding the top panel in an extended horizontal position comprises a hinged rod having a hinge near a midpoint thereof.

3. The foldable pet shelter of claim 2 further including a tube movable over the hinge to prevent the hinged rod from unhinging.

4. The foldable pet shelter of claim 1 wherein the end panel is fabricated from an open mesh.

5. The foldable pet shelter of claim 1 further including means for removably attaching the right and left sides of said end panel to said right and left panels.

6. The foldable pet shelter of claim 1 where said exterior panel is an exterior door.

* * * * *